United States Patent
Munson et al.

(10) Patent No.: US 8,909,560 B2
(45) Date of Patent: *Dec. 9, 2014

(54) PRACTICAL MODEL FOR HIGH SPEED FILE DELIVERY SERVICES SUPPORTING GUARANTEED DELIVERY TIMES AND DIFFERENTIATED SERVICE LEVELS

(75) Inventors: Michelle Christine Munson, Berkeley, CA (US); Serban Simu, Oakland, CA (US); Ying Xu, Emeryville, CA (US)

(73) Assignee: Aspera, Inc., Emeryville, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 13/285,554

(22) Filed: Oct. 31, 2011

(65) Prior Publication Data

US 2012/0047093 A1    Feb. 23, 2012

Related U.S. Application Data

(63) Continuation of application No. 12/321,314, filed on Jan. 16, 2009, now Pat. No. 8,051,017.

(60) Provisional application No. 61/021,766, filed on Jan. 17, 2008.

(51) Int. Cl.
| | |
|---|---|
| *G06Q 30/02* | (2012.01) |
| *H04L 12/835* | (2013.01) |
| *G06Q 30/04* | (2012.01) |
| *H04L 12/891* | (2013.01) |
| *G06Q 20/10* | (2012.01) |
| *H04L 12/801* | (2013.01) |
| *H04L 12/841* | (2013.01) |
| *G06Q 30/06* | (2012.01) |

(52) U.S. Cl.
CPC ............... *H04L 47/10* (2013.01); *H04L 47/30* (2013.01); *G06Q 30/04* (2013.01); *H04L 47/41* (2013.01); *G06Q 20/102* (2013.01); *G06Q 30/0284* (2013.01); *H04L 47/11* (2013.01); *H04L 47/283* (2013.01); *Y02B 60/33* (2013.01); *G06Q 30/0601* (2013.01); *G06Q 30/0283* (2013.01)
USPC ........................................................ 705/418

(58) Field of Classification Search
None
See application file for complete search history.

(56) References Cited

U.S. PATENT DOCUMENTS

| | | | | |
|---|---|---|---|---|
| 7,711,594 | B2 * | 5/2010 | Lund ........................... | 705/7.35 |
| 7,802,008 | B2 * | 9/2010 | Akinlar et al. ............... | 709/235 |

(Continued)

FOREIGN PATENT DOCUMENTS

WO    WO-2009/091580 A1    7/2009

OTHER PUBLICATIONS

Chakraborty Set al: "Supporting a low delay best-effort class in the presence of real-time traffic" Real-Time and Embedded Technology and Applications Symposium, 2002. Proceedings. Eighth IEEE Sep. 24-27, 2002, Piscataway, NJ, USA, IEEE, pp. 45-54, XP010621734 ISBN: 978-0-7695-1739-1.*

(Continued)

*Primary Examiner* — Chi H Pham
*Assistant Examiner* — Kouroush Mohebbi
(74) *Attorney, Agent, or Firm* — Schwegman Lundberg & Woessner, P.A.

(57) ABSTRACT

A practical economic and technical model for building commercial-grade electronic file delivery services that provide the same scale, predictability, and differentiated service levels as physical courier services traditionally used to move electronic data on physical media. Systems and methods for providing such services using a charge-back scheme based on congestion pricing are described.

20 Claims, 3 Drawing Sheets

(56) References Cited

U.S. PATENT DOCUMENTS

| | | |
|---|---|---|
| 8,051,017 B2 | 11/2011 | Munson et al. |
| 2005/0203835 A1 | 9/2005 | Nhaissi et al. |
| 2009/0063698 A1* | 3/2009 | Xu et al. .............. 709/233 |
| 2009/0276271 A1 | 11/2009 | Munson et al. |

OTHER PUBLICATIONS

"U.S. Appl. No. 12/321,314, Non-Final Office Action mailed Aug. 18, 2010", 14 pgs.

"U.S. Appl. No. 12/321,314, Final Office Action mailed Apr. 5, 2011", 15 pgs.

"U.S. Appl. No. 12/321,314, Notice of Allowance mailed Jul. 21, 2011", 9 pgs.

"U.S. Appl. No. 12/321,314, Response filed Jul. 5, 2011 to Final Office Action mailed Apr. 15, 2011", 10 pgs.

"U.S. Appl. No. 12/321,314, Response filed Dec. 20, 2010 to Non Final Office Action mailed Aug. 18, 2010", 13 pgs.

"International Application Serial No. PCT/US2009/000275, Search Report mailed Jun. 10, 2009", 6 pgs.

"International Application Serial No. PCT/US2009/000275, Written Opinion mailed Jun. 10, 2009", 7 pgs.

Chakraborty, S., et al., "Supporting a low delay best-effort class in the presence of real-time traffic", Real-Time and Embedded Technology and Applications Symposium, (Sep. 24, 2002), 45-54.

Francini, A., et al., "Enhanced Weighted round robin schedulers for accurate bandwidth distribution in packet networks", Computer Networks vol. 37(5), (Nov. 22, 2001), 561-578.

Garg, R., et al., "Performance analysis of rate controlled schedulers in virtual networks", N.A, 2007, (2007), 10 pgs.

La, R. J, et al., "Utility Based Rate control in the internet for Elastic Traffic", IEEE/ACM Transactions on Networking vol. 10(2), (Apr. 1, 2002), 272-286.

\* cited by examiner

PRACTICAL MODEL FOR HIGH SPEED FILE DELIVERY SERVICES SUPPORTING GUARANTEED DELIVERY TIMES AND DIFFERENTIATED SERVICE LEVELS

RELATED APPLICATIONS AND CLAIM OF PRIORITY

This application is a continuation of and claims the benefit of priority under 35 U.S.C. §120 to U.S. patent application Ser. No. 12/321,314, filed on Jan. 16, 2009, which issued as U.S. Pat. No. 8,051,017 on Nov. 1, 2011, which claims the benefit of priority under 35 U.S.C. §119(e) to U.S. Provisional Patent Application Ser. No. 61/021,766, filed Jan. 17, 2008, the benefit of priority of each of which is claimed hereby, and each of which are incorporated by reference herein in its entirety.

This application also incorporates by reference the specifications of the following applications in their entirety: U.S. Provisional Patent Application Ser. No. 60/638,806, filed Dec. 24, 2004, entitled: "BULK DATA TRANSFER PROTOCOL FOR RELIABLE, HIGH-PERFORMANCE DATA TRANSFER WITH INDEPENDENT, FULLY MANAGEABLE RATE CONTROL"; U.S. patent application Ser. No. 11/317,663, filed Dec. 23, 2005, entitled "BULK DATA TRANSFER"; and U.S. patent application Ser. No. 11/849,742, filed Sep. 4, 2007, entitled "METHOD AND SYSTEM FOR AGGREGATE BANDWIDTH CONTROL."

BACKGROUND

Throughout the media and entertainment industry, traditional analog processes are being rapidly replaced by all-digital, file-based workflows. At the heart of most digital workflows is the basic requirement to move file-based data between business units, or between companies—from raw media ingest, through post-production, through semi-final dubbing, localization, or replication, to consumer distribution—evermore file based media is moving between entities. For many years, some amount of electronic file transfer has been done through traditional FTP, or dedicated delivery services that offload the delivery to private network services, but in large part, most media is still physically shipped or couriered from place-to-place. There are many reasons for this—file sizes are too large to practically transfer given the poor bandwidth utilization of traditional protocols like FTP, dedicated delivery services have been notoriously expensive, especially for heavy usage, and electronic services are perceived as being not quite ready, insecure, inconvenient, or unproven. We believe that all of these reasons are part of the overarching problem that it is has not before been possible to build a commercial grade electronic file delivery service that minors the physical couriers—that can provide fast, convenient world-wide delivery including an economic model to price and charge back based on delivery time.

There is not yet an electronic file transfer service (or even the economic or technological model to build such) that offers the simple basic qualities of a service like Federal Express®, UPS®, or other commercial couriers. In the physical delivery domain these services allow a user to purchase a delivery time guarantee for a parcel to be moved, potentially world-wide. Pricing depends on when the delivery must arrive, and the size of the parcel. Complete end-to-end tracking is built-in. If demand for the service increases, the price rises; if deliveries are late, users take their business to other couriers. Normal market forces work easily to create a market-bearing price and a system that everyone feels they can live with—if you need your delivery to arrive earlier, you pay more, and, the corollary, if you pay more, you can count on the delivery time purchased.

In contrast, in the electronic file transfer domain, the classic attempt to move files uses traditional FTP, or perhaps a dedicated delivery service that performs the delivery on your behalf. FTP (and traditional TCP-based file transfer protocols) are unreliable over the wide area, fail to utilize bandwidth, and can't guarantee delivery times over networks with variable packet loss and round-trip delay. Even if delivery times could be guaranteed, the service provider offering FTP has no means to creating a meaningful pricing system based on the utility of the delivery to you—when the delivery arrives, and the corresponding cost of that delivery's network usage to other users.

Some companies turn to dedicated delivery services as workarounds; these services may send files over satellite transmission or other expensive infrastructures to help ensure delivery times, and charge the cost of that infrastructure back to the user based on how many bytes a user sends. The pricing becomes prohibitive with usage and sacrifices the benefits of flat-rate commodity Internet bandwidth, in an effort to get some amount of quality of service guarantee.

DETAILED DESCRIPTION

Described herein is a system and method for providing commercial-grade electronic file transfer services that can scale in the same way as the physical courier services have to date, using the needs of the digital media supply chain as a driving case. Such electronic file delivery services must deliver files in guaranteed times (even globally, and at high-speeds), offer differentiated service levels, and provide a fair, practical charge-back system for the service providers. We introduce a practical economic model for building such services and the new but ready technology components.

Features of Commercial Grade Couriers and Challenges in the Electronic Domain

We start by describing the features of a commercial grade, electronic file transfer service considering the capabilities of the physical shipping services. We explain the shortcomings of current technologies and missing pieces that stand in the way of realizing the same capabilities in the electronic domain.

When a user orders a shipment through a physical courier service, as opposed to say, using the standard postal service to send a package, the primary reason for paying for the service is to ensure the delivery time of the parcel. Moreover, the user expects to pay a price that generally correlates with the parcel arrival time; the earlier the required arrival the more the user expects to pay. Commercial couriers are able to offer this pay-for-arrival-time service not only on a local or regional basis, but world-wide. If the destination is global, the user expects no more risk in meeting the target arrival time than if the delivery were sent to a local destination.

Electronic transfer services have not succeeded in large scale to date because conventional technologies fail to provide the necessary capabilities to recreate such a model, in several ways. First, traditional TCP-based file transfer protocols are slow over the wide area and can not guarantee delivery times if the user wanted to pay for such. Second, the flow-rate bandwidth allocation used by TCP provides no means for providers to build a reasonable charge-back system for users to pay for deliveries based on the natural utility objective—achieving delivery time—or the real cost of deliveries to the system—the congestion caused to other deliveries forcing them to slow down. We explain both points in the following sections.

Figure 1:
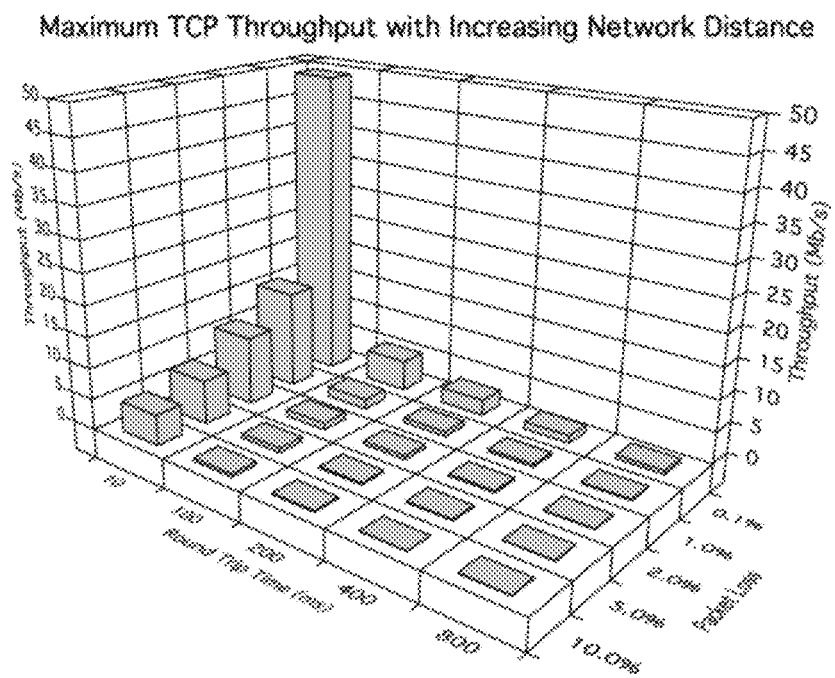
FIG. 1 shows the maximum throughput achievable under various packet loss and network latency conditions for file transfer technologies that use TCP.
Figure 2:
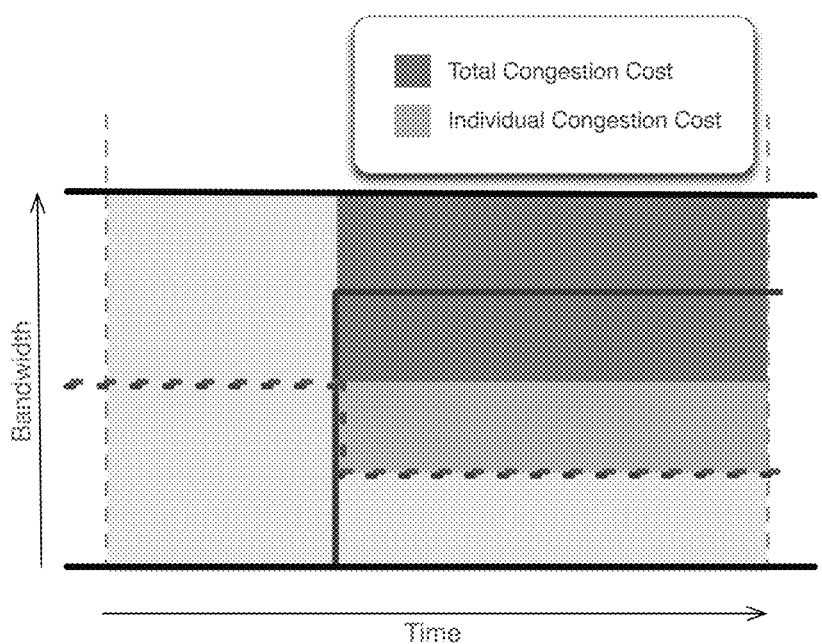
FIG. 2 illustrates an example of congestion cost computation.

FTP and conventional file transfer protocols built on the transmission control protocol (TCP) suffer from an inherent throughput bottleneck in the TCP protocol that cause wide area file transfers to be impractically slow in many cases, inconsistent, and unpredictable. TCP has an inherent throughput bottleneck that becomes more severe with increased packet loss and latency. The bar graph in FIG. 1 shows the maximum throughput achievable under various packet loss and network latency conditions on an OC-3 (155 Mbps) link for file transfer technologies that use TCP (shown in yellow). The throughput has a hard theoretical limit that depends only on the network round-trip time (RTT) and the packet loss. Note that adding more bandwidth does not change the effective throughput. File transfer speeds do not improve and expensive bandwidth is underutilized.

The source of the throughput bottleneck is the mechanism TCP uses to regulate its data flow rate. The TCP sender requires an acknowledgement of every packet from the TCP receiver in order to inject more data into the network. When an acknowledgement is missed, TCP assumes that it is overdriving the network capacity and enters an aggressive congestion avoidance algorithm. This algorithm reduces the data flow rate severely, and recovers the rate too slowly to keep modem pipes full. Even small variation in round-trip latency or bit errors due to the network media—not even due to congestion—can cause TCP to enter congestion avoidance. Standard TCP is not equipped to distinguish these sources of packet loss from true link congestion. The consequences to file transfer are dramatic.

TCP file transfers are slow and bandwidth utilization of single file transfers is poor. In campus area networks with even negligible packet loss (far left corner of the graph), the maximum TCP throughput will not fill modern high-speed links. Standard TCP halves its throughput in response to a single packet loss event, and at high speeds, even a low loss percentage significantly lowers TCP throughput, leaving bandwidth underutilized.

The bandwidth utilization problem compounds on wide area links where increased network latency combines with packet loss. A typical FTP transfer across the United States has a maximum theoretical limit of a few megabits per second, and on a typical global link degrades from megabits to kilobits per second. "Tuning" the operating system parameters used by the TCP networking stack on the file transfer endpoints or applying a TCP acceleration cause TCP to use a larger default "window" and improves throughput on clean networks, but the improvement degrades or even vanishes with the packet loss typical of wide area networks.

Throughput reduces with increasing packet loss, and achieving consistent, predictable transfer rates (and times) is impossible. It is actually not possible to prevent an unmodified standard (Reno) TCP stack from reducing throughput on packet loss, even in cases where the user has paid for a priority delivery time, or when the packet loss is merely an artifact of the network media, such as satellite or wireless networks. Offering commercial-grade, guaranteed transfer times using standard FTP or similar protocols to remote sites around the world, where the WAN paths have high and variable packet loss, is simply not possible. The problem is most severe for large data set transfers, as the probability of stall or failure increases with duration.

In addition to the TCP performance bottleneck, traditional TCP transfer protocols rely on a rate-based bandwidth allocation that is opaque to the cost and benefit of meeting transfer deadlines from the user's perspective, and is thus ill-suited for pricing usage of the network. When the demand for bandwidth on a network exceeds supply, TCP's rate control causes multiple flows competing for the bandwidth to reduce in speed according to a single policy that aims to give all flows an equal share of the bandwidth. This has the obvious problem that when a particular flow needs to take more of the bandwidth, i.e. because a user has paid for a guaranteed delivery time, there is no explicit mechanism to do so. But a deeper problem for a file delivery service is that this apparently "fair" way of charging flows for each other's usage is ignorant of the actual goals of the user.

For example, TCP's per-flow rate allocation has no knowledge of how many flows a given user or program is running, or how long these flows have been running. As a result, a greedy user can open up as many transfer streams as he or she likes and pay no more than the user running only one flow. Similarly, a long running transfer that causes many other transfers to reduce in rate pays no more than a short transfer having no impact. In summary, the flow-rate allocation of TCP neither ensures fairness between competing transfers, nor provides a basis to fairly charge users for their use of the transfer network. It has been argued that the flow-rate based allocation of standard TCP is the wrong basis for achieving a pricing system for usage of shared networks. (See, e.g., B. Briscoe. Flow Rate Fairness: Dismantling a Religion. *ACM SIGCOMM Computer Communication Review*, 37(2): 65-74, April 2007; F. P. Kelly, A. K. Maulloo, and D. K. H. Tan. Rate control for communication networks: shadow prices, proportional fairness and stability. *Journal of the Operational Research Society*, 49(3):237-252, 1998.) It is argued that instead, the logic for determining how bandwidth is allocated among competing network flows—in our world, competing network transfers—should be at the network endpoints, and exposed directly to users and their programs. Furthermore, the price of the network usage should be based directly on the benefit the user is deriving—in an electronic file delivery service, when the transfer will complete—and the cost to other users—in an electronic file delivery service, how much the user's transfer causes other user's transfers to slow down.

The argument calls for "congestion-based" pricing that charges users specifically for the congestion that their usage of the shared network causes other user's flows, over time. The author argues that this model avoids the natural loopholes in flow-rate based pricing, where legitimate users and programs simply open up multiple transfer streams in an attempt to get a higher bandwidth allocation (as in parallel stream or BitTorrent peer-to-peer applications), and where users that "run longer" pay no more than user transfers that are short in duration. The model charges users precisely for the benefit they derive—transfer finish times—and it creates a natural market where providers have to compete to provide users with the most competitive price to achieve their goal. For example, say users are consistently charged more for the same delivery time on one provider's network than on another due to congestion; the users will eventually switch providers, and the losing provider will have an incentive to add bandwidth.

Electronic File Delivery Service

Described herein is a model for an electronic file delivery service that uses congestion-based pricing to charge users for deliveries having a guaranteed finish time. We assume that users will expect and providers will offer a flat rate subscription for transfer bandwidth, as flat rate services have become the norm for Internet services. And, we provide a technical means to cap the total bandwidth used by all transfers from a user to not exceed the subscribed bandwidth in the default case, to avoid over provisioning. We then offer the congestion-based pricing for transfers that need more bandwidth to meet their deadline. The price of an overage delivery is put to the user directly in terms of its benefit—the transfer deadline—and is determined by its cost to other users—how much the user's transfer causes other transfers to slow down, as congestion over time. Our model relies on new transport technology that has no artificial throughput bottlenecks with network delay and packet loss, and a dynamic rate control that can be used to fulfill target bandwidth usage policies.

In this section, we introduce our model, first as an economic model, in practical terms, describing how providers would supply the delivery service to users and charge for its usage.

To recap, the goal of our model is to support an electronic file delivery system that can provide high speed transfers, guaranteed delivery times, even at global distances, and effective charge back to users based on their cost. The system model can be applied by service providers at all levels of the content delivery chain—Internet Service Providers supplying bandwidth to media service providers, media service providers providing file delivery services to studios, and studios buying access to these file delivery services and supplying shared access to their competing projects. Similarly, the model can also be applied in a consumer delivery context.

In one particular form, the model has two entities: 1) Providers, the entities that provide bandwidth and application services for delivering files electronically, such as Internet Service Providers, Content Delivery Networks, and Media Services companies, and 2) Users, the economic entities that pay Providers to move file based data from one destination to another. In media and entertainment these may be Studios and other Content Creators purchasing services from Media Services companies, or even Media Services companies purchasing delivery services or bandwidth from ISPs to resell. This version of the model also makes the following assumptions. First, transfers are run with a file transfer protocol that, unlike TCP-based protocols such as FTP, does not have artificial bottlenecks in throughput with round-trip delay and packet loss, and which supports multiple bandwidth usage policies. Adjustments in transfer rate are based exclusively on intentional adjustments due to the desired bandwidth usage relative to other network traffic. (The fasp protocol is an example transfer protocol that provides these properties.) Second, we assume that each user buys a flat amount of bandwidth from their provider per month. We do not assume to change the natural flat-rate subscription model that users have grown used to in all Internet-based services.

The described system is self-regulating. All of its properties are achieved automatically through the technology implementation and no centralized command/control is needed. Users make orders for file delivery in terms of the desired deadline for transfer completion. As mentioned, we assume that each user purchases flat-rate bandwidth capacity (and providers enforce the capacity using the technology described below). Normally, a user's deliveries run within the flat-rate bandwidth allocation. However, for guaranteed delivery times that exceed the user's flat rate bandwidth (overages), a price is computed based on the congestion penalty to other user's transfers in order to meet the Guarantee time. Users can review the price for the current load before ordering, and choose a delivery time accordingly.

An exemplary system offers to the user two classes of service:

A "Best Effort" service, which will transfer the data as fast as possible in any bandwidth remaining after all Guaranteed Time transfers for the User are serviced. "Best Effort" transfers for the same user share the remaining non-Guaranteed bandwidth equally among themselves, dynamically reapportioning their speeds to take an equal share. The Best Effort jobs ramp up to use unused bandwidth as transfers finish, and ramp down to avoid congesting other transfers, as new jobs start. This class is similar to the standard postal delivery service, which moves mail as rapidly as possible given available resources.

A "Guaranteed Time" service, which will transfer the files to the destination by the user's desired delivery time. There may be a cost associated with such a delivery, depending on whether the delivery time requires exceeding the flat rate bandwidth purchased, and whether the delivery causes congestion (takes bandwidth) otherwise needed by other users. The system provides the user a price in advance of their delivery for the congestion to be caused, based on the currently running jobs in the system. The system measures the congestion cost of such deliveries to other transfers using the network queuing delay experienced by these flows, as described in Section 4. (We avoid loss-based measurement of congestion which requires over-provisioning the network merely to determine a price.) The congestion cost can be used by the Provider to set both the actual and the anticipated delivery price to the user, using whatever specific pricing model the Provider deems appropriate.

When a User starts a delivery, she issues the order as either "Best Effort" or "Guaranteed Time". In the "Best Effort" case, the deliveries will always run within the user's flat rate bandwidth, and will never charge the user overages. In the Guaranteed Time case, the delivery time may require bandwidth exceeding the User's flat rate plan, and may result in overage charges. To compute the overage charge, our system calculates a Congestion Cost of the overage, which is the total bandwidth the transfer takes from other user's Best Effort transfers integrated over the transfer duration, or visually, the "area" under the bandwidth that intersects with other Best Effort Flows. Formally put, the Congestion Cost ($C_f$) of a User's Guaranteed Time flow to another User's Best Effort flow f is the reduction in bandwidth the flow endures from its otherwise Best Effort rate (dB), integrated over the duration of the reduction:

$$Cf = \int^T dB dt$$

And, the total Congestion Cost is the sum of the costs to each Best Effort flow of other Users currently in the system.

$$C = \sum_F Cf$$

FIG. 1 illustrates the Congestion Cost computation showing flows represented by dashed lines that are Best Effort transfers that reduce their throughput to allow the transfer from another user shown with a solid line in to use the bandwidth needed for a guaranteed deadline. The cost to the Best Effort transfers is the dark shaded area, the bandwidth consumed by the Guaranteed Time transfer and taken from the Best Effort transfers.

Figure 3:
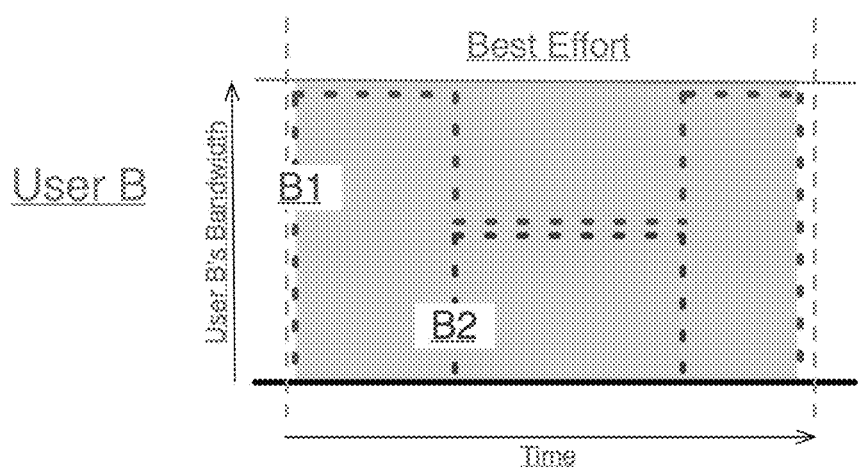
FIG. 3 illustrates a best effort delivery scenario.

The following individual cases and diagrams detail possible scenarios:

1) Best Effort Delivery—In this case, illustrated by FIG. 3, when a User starts the "Best Effort" delivery, other "Best Effort" deliveries adjust down in speed to equally share the user's flat-rate bandwidth. For example, assume User B has a flat-rate bandwidth of 100 Mbps, and one delivery running (at full capacity). When a new delivery is started, the first delivery will reduce in speed from 100 Mbps to 50 Mbps, and the new delivery will run at 50 Mbps. If the user's new delivery is for a 1 GB file, the transfer interface can report a currently anticipated delivery time of about 3 minutes from start (1 GB transfers in 3 minutes at 50 Mbps). If User B starts additional deliveries in these 3 minutes, the finish time will increase proportionally.

Figure 4:
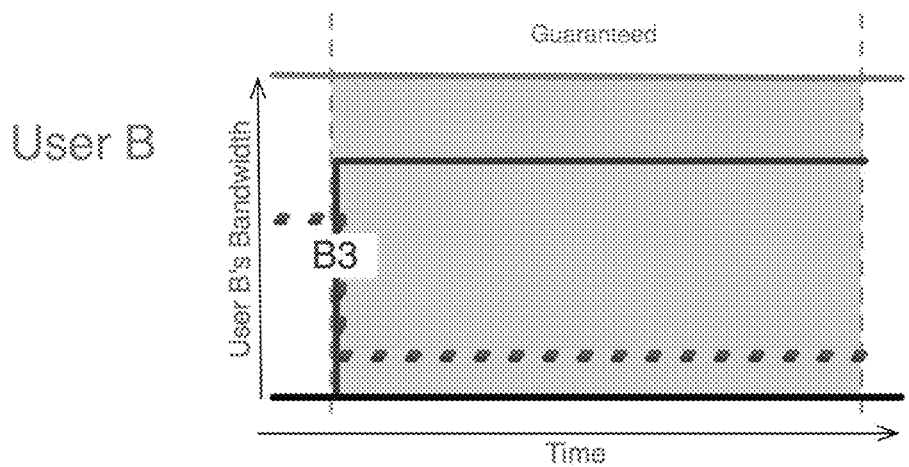
FIG. 4 illustrates a guaranteed time delivery scenario.

2) Guaranteed Time Delivery within Available Bandwidth—In this case illustrated by FIG. 4, the desired finish time for a Guaranteed Delivery requires an amount of bandwidth that is available within the flat rate bandwidth purchased, other users' transfers are not affected and the charge is 0. In this case, we assume the two Best Effort transfers of User B are currently running each at half of the bandwidth (50 Mbps), using the user's entire flat-rate (100 Mbps). User B orders a new Guaranteed Time transfer that will require 75 Mbps to finish in time, e.g. a 1 GB file transfer completing in 1.5 minutes. In this case the Guaranteed Time transfer is allocated the 75 Mbps needed, and the remaining Best Effort transfers each reduce in speed to use the remaining 25 Mbps, for 12.5 Mbps each. If the desired finish time requires an amount of bandwidth that is not available within the flat rate bandwidth purchased, then the delivery must consume bandwidth otherwise sold to other users. There may be a charge, depending on whether other user's transfers must slow down.

Figure 5:
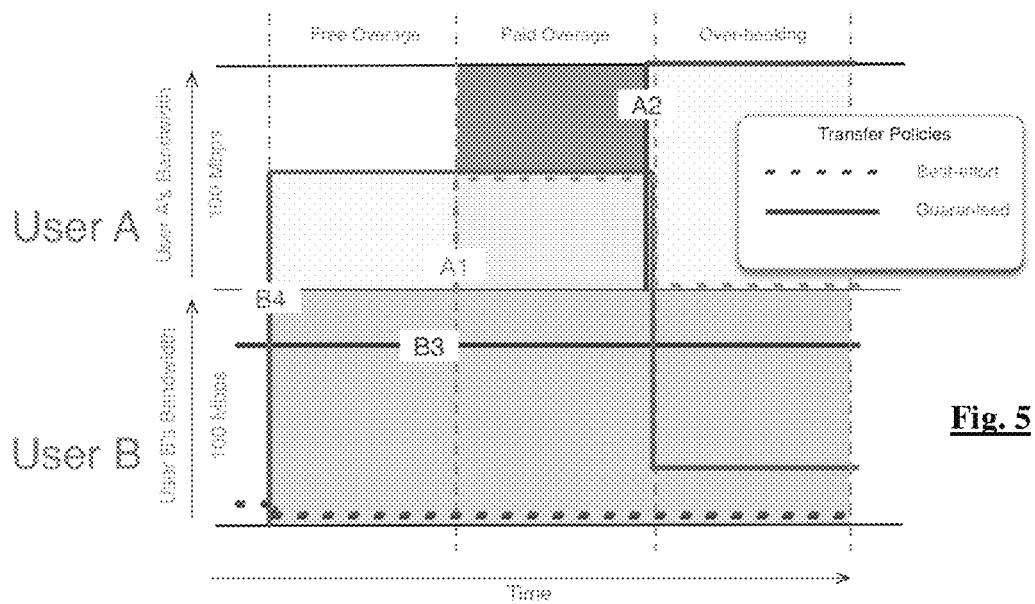
FIG. 5 illustrates various overage scenarios.

3) Free Overage—In this case, illustrated by FIG. 5, the amount of overage bandwidth required to meet a User's Guaranteed Delivery Time is not currently used by other users, and so the charge is 0. In this case, we assume that User B orders a new Guaranteed Time delivery that requires 75 Mbps to finish in time. In this case, the available bandwidth for User B is only the 25 Mbps (used currently by the Best Effort transfers). The delivery must use 50 Mbps of User A's bandwidth. User A is currently running no transfers, so the overage charge is 0.

4) Paid Overage—If the amount of overage bandwidth required is available by slowing down "Best Effort" deliveries by other users, the price is computed based on the congestion experienced by other users' deliveries for the duration of the transfer. In this case, we assume that User A now requests a Best Effort delivery. If User B's transfer were not running, User A's transfer would utilize the full flat-rate bandwidth (100 Mbps). Since User A's transfer is slowed to 50 Mbps, the congestion caused cost by User B is the 50 Mbps of bandwidth consumed, multiplied by the total time of transfer.

5) Overbooking—If the amount of overage bandwidth required is not available from other Users and requires taking bandwidth from other user's Guaranteed transfers, the system reports back the best finish time that can be done without taking bandwidth from these transfers, and a charge based on the ensuing congestion for all Best Effort users. Using our example, assume that User A starts a new Guaranteed Time transfer that requires the full 100 Mbps to complete in time. In this case, User A's Best Effort transfer slows down to 0, and one of the Guaranteed Transfers from User B will be slowed down to the 25 Mbps remaining in B's allocation. Note that Overbooking is the only case in which Guaranteed Transfers risk being slowed down.

6) How the congestion charge is computed—The congestion cost is computed using the additional total congestion other Users' Best Effort flows incur due to the Guaranteed Time transfer for the duration of the transfer. The particular metric used to measure congestion in our implementation is network queuing delay—we explain why and how it is measured in Section 4. The Best Effort flows use a dynamic rate control algorithm that aims to maintain a stable amount of queuing delay along the transfer path, and reduce transfer speed in response to network queuing delay, using an internal rate control algorithm. The congestion cost to a flow then, in our system, is the consequent reduction in transfer throughput, as a result of the additional queuing caused by the Guaranteed Transfer, times the duration of the reduction.

For example, if two Best Effort Transfers of User A are sharing a 100 Mps flat-rate bandwidth, when a Guaranteed Time transfer of User B runs taking 75 Mbps of User A's bandwidth, the two Best Effort transfers of A reduce in throughput from 50 Mbps to 12.5 Mbps each. The congestion cost to each transfer is 37.5 Mbps, integrated over the duration of the transfer. If the Guaranteed Time transfer of B runs for 2 minutes, the congestion cost to each Best Effort transfer of A is 37.5 Mps*120 s=4500 megabits, for a total cost of 9000 megabits total, or the 75 Mbps of bandwidth the Guaranteed Time transfer took, over 120 s.

The system may maintain a complete historical record of the congestion experienced by flow over time, which providers can use to accumulate the user's congestion costs over an entire billing cycle.

Technology Implementation

In this section, we cover the new technologies that are utilized in implementing the model—their capabilities and how they are utilized to achieve a multi-user electronic file delivery system that can guarantee delivery times (even globally, and at high-speeds), offer differentiated service levels, and provide a fair, practical charge-back system for the service providers. The system requires no centralized control—the delivery time guarantees, bandwidth sharing, and the charging system all work through the system's built-in mechanisms. An exemplary system utilizes the fasp protocol, and several new technology innovations that build upon it. Below, we describe each, and its role in the system.

1) fasp Protocol—In one embodiment, each transfer is run with the fasp protocol that is described in detail in co-pending U.S. patent application Ser. No. 11/317,663. The fasp throughput is independent of network delay and does not degrade in bandwidth efficiency with packet losses, so that even when deliveries are done over distant global paths, the transfer rate degrades no more than the actual packet loss on the channel. This means when a user requests a Guaranteed Time delivery to Asia, and we assume a worst-case 10% packet loss rate on the transfer path, the system can be assured of meeting the target transfer time within 10% of the user's requested deadline. (This assurance level can even be built formally into a user's service level agreement.)

2) Per-flow Adaptive Rate Control—The dynamic bandwidth allocation among Best Effort transfers is achieved using a per-transfer dynamic rate control in fasp, referred to as Adaptive Rate Control, that aims to utilize unused network bandwidth, but also reduce rate to allow for bandwidth demands from other transfers. Adaptive Rate Control uses a dynamic measurement of network queuing delay as the primary input signal for available bandwidth or ensuing congestion. (Network queuing delay is the additional round-trip delay on an end-to-end network path experienced when a flow is running, as compared to when the flow is not present.) The approach aims to maintain a small, stable amount of "queuing" in the network (no congestion); a transfer rate adjusts up as the measured queuing falls below the target (indicating that some bandwidth is unused and the transfer should speed up), and adjusts down as the queuing increases above the target (indicating that the bandwidth is fully utilized and congestion is eminent).

Unlike TCP's rate control, the fasp Adaptive Rate Control has several capabilities that are particularly suited for use in the described system. First, it reacts only to network queuing delay, and thus does not artificially slow down over networks with packet loss due the media, allowing us to maintain delivery times. Second, the dynamic range allows for Best Effort flows that reduce their transfer rate when bandwidth must be used by Guaranteed Rate flows, but automatically ramp up to fully utilize unused bandwidth for the most efficient delivery times. Third, the built-in response to network queuing delay provides a virtual "handle" to adjust the total bandwidth used by all Best Effort transfers by a single user to NOT exceed the User's paid for capacity using a Virtual Link as described below. Fourth, the built-in response to network queuing delay provides a quantifiable way to measure the congestion endured by a Best Effort flow. The flow will experience queuing in direct proportion to the congestion caused by other Users' flows. The duration is known through the fasp protocol logging and billing can be generated accordingly.

3) Virtual Link—An aggregate rate controller called Virtual Link (that may be built into fasp) gracefully caps the total bandwidth used by all of a user's Best Effort transfers to the User's total subscribed flat rate bandwidth, and provides a means to track the congestion cost of other user's transfers. The Virtual Link ensures that bandwidth can never be over-provisioned unless the User specifically selects an overage, and by accounting for Guaranteed Bandwidth taken by other flows over time, calculates a congestion cost to each Best Effort transfer. The Virtual Link is described in detail in U.S. patent application Ser. No. 11/849,742 and in Y. Xu, S. Simu, and M. Munson, Virtual Link Control: Architectural Design and Analytical Analysis, Aspera, Inc. Technical Whitepaper, April 2007.

Virtual Link is a logical controller that regulates all transfer sessions sharing the same network link to maintain a total target throughput (the "Virtual Link Bandwidth"). The mechanism works in a fully-decentralized manner through the coordination of active transfer sessions crossing a network transfer endpoint, using the per-flow queuing response of fasp's Adaptive Rate Control. In an exemplary system, all Best Effort transfer sessions crossing an endpoint in a provider's network use a Virtual Link equal to the user's purchased flat-rate.

Each Best Effort fasp transfer for a User listens for reports at all times for all active transfers and computes the total throughput all other Best Effort flows for the User, less the total throughput for all Guaranteed Time flows for others. The transfer computes the total queuing delay that the group would experience if running over a physical link of the Virtual Link bandwidth, less the Guaranteed of other users.

For example, if a user has two active Best Effort transfers, and has purchased a 100 Mbps plan, implemented as a 100 Mbps Virtual Link, the two active transfers compute an Adapted Rate of 50 Mbps. If a third transfer is started with a 40 Mbps Guaranteed Rate, the Virtual Link logic in each transfer will compute a total transfer rate of 50+50=100 Mbps, subtract off the 40 Mbps Guaranteed Rate for 60 Mbps of Virtual Link bandwidth, and will compute the resulting queuing for 100 Mbps on a 60 Mbps link. The resulting queuing is divided equally over the two flows, and each flow's Adaptive Rate Control will compute an Adapted Rate of 30 Mbps.

Each active transfer reports to a centralized management program the reduction in Virtual Link bandwidth for the Guaranteed Transfers of other users on a periodic basis and the values are multiplied over the period to calculate a congestion cost.

The system and method as described above provides a means for building commercial-grade, global electronic file transfer services that can scale in the same way as the physical courier services have to date. The system can guarantee delivery times (even globally, and at high-speeds) and offer differentiated service levels, using the capabilities of modern high-speed transport protocols, such as fasp. Equally important, the system provides a fair, practical charge-back system for the service providers. Unlike TCP-based rate allocations that unnaturally apportion bandwidth based on a fixed policy without regard to the user's goals, the model uses a natural congestion-based pricing that values the actual benefit the user derives from the system—the time at which deliveries complete—and the actual cost in transfer time to other users of the system. An exemplary system includes a transport with dynamic rate control that can fulfill differentiated delivery service levels, and an aggregate bandwidth capping mechanism that self-throttles all transfers of a certain user to a fixed rate bandwidth, unless the user specifically chooses an overage. The system requires no centralized control and audit quality logs can be created in the process.

Exemplary Embodiment

In an exemplary embodiment of the system and method as described herein, one or more host processors are connected to a network, and one or more of the host processors are programmed with one or more groups of one or more processes that transfer data over a network as regular data transfers. Regular data transfers refer to those data transfers performed with some nominal allocation of bandwidth. For example, a particular user may be assigned a certain portion of the available bandwidth for use in transferring data by all of the processes owned by that user. A virtual link control module is integrated into the processes that execute regular data transfer for limiting the rate at which those processes transfer data over the network. The virtual link controller determines an aggregate traffic rate of the data transferred over the network by the regular data transfers and provides a virtual link through which the regular data transfers flow. The virtual link includes a virtual queue that is filled or emptied in accordance with whether the aggregate traffic rate is greater than or less than, respectively, a specified bandwidth limit $c_l$. A rate control module integrated into the processes regulates the data transfer rate $x(t)$ of each of the regular data transfers based upon a calculated virtual queuing delay reflective of the extent to which the virtual queue is filled with data. One or more of the host processors are also programmed with one or more processes that transfer data over the network as preferred data transfers that meet a specified delivery deadline. Preferred data transfers are given priority over the regular data transfers in order to meet the specified deadline. That is, the bandwidth otherwise allocated to regular data transfers is used by the preferred data transfers as necessary. In order to determine how much bandwidth is taken away from the regular data transfers (i.e., the bandwidth that the regular data transfers would have used were it not for the preferred data transfers taking place), the virtual link control module is further configured to determine a congestion cost to the regular data transfers as a result of the preferred data transfers. For example, an increase in the occupancy of the virtual queue or an increase in the virtual queuing delay may be used as an indication of the congestion cost. In one particular embodiment, the system decreases the specified bandwidth limit $c_l$ of the virtual link to an extent necessary for the preferred data transfers to meet the specified delivery deadline, while the preferred data transfers execute outside of the virtual link. In another particular embodiment, the preferred data transfers execute within the virtual link but with a higher data transfer rate than the regular data transfers also transferring data over the virtual link. The preferred data transfers then execute at a constant rate sufficient to meet the specified delivery deadline through the virtual link. The preferred data transfers may also be performed at the greater of the maximum rate at which there is no congestion cost and the minimum rate necessary to meet the requested delivery deadline. A preferred data transfer could also be performed at a data transfer rate that is as high as possible without the congestion cost exceeding a price charged for the preferred data transfer. The regular data transfers may be performed using a data transfer rate that is as high as possible without compromising the specified preferred performance parameter.

Figure 6:
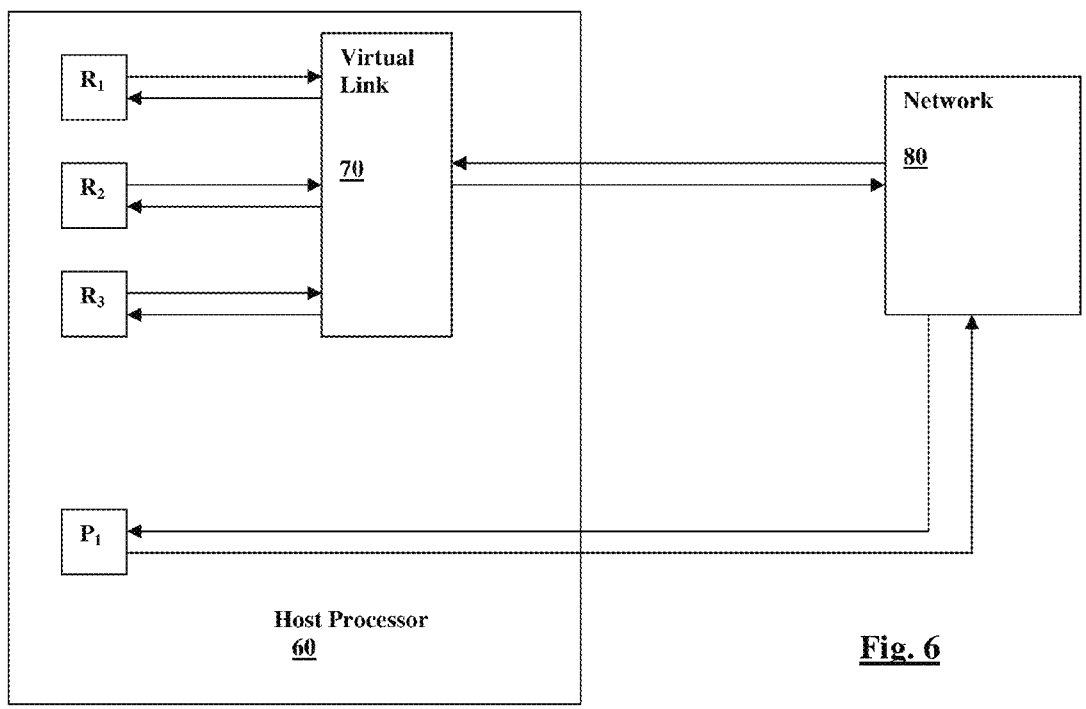
FIG. 6 illustrates an exemplary system.

FIG. 6 shows a diagram of an example system. Shown is a host processor 60 in which processes run to execute regular or preferred data transfers over a network 80. The host processor 60 is programmed with software modules for carrying out the various functions described herein. Any of the methods described herein may also be embodied as processor-executable instructions contained in a computer-readable medium. In this example, processes $R_1$ through $R_3$ are executing regular data transfers through the virtual link 70, while the process $P_1$ executes a preferred data transfer over the network outside of, and not constrained by, the virtual link. In an alternative embodiment, the process $P_1$ would also execute its preferred transfer data through the virtual link but at a higher data rate than the regular data transfers.

The system may also be used to calculate a relative price, either charged for the preferred data transfers or credited to the regular data transfers, as a function of the congestion cost. The congestion cost may be derived from a slowdown caused to existing regular data transfers calculated as the total rate decrease of all regular data transfers from a nominal allocated rate times the duration of the slowdown. A price charged for regular data transfers may also be decreased as a function of the congestion cost due to the preferred data transfers.

The system may also calculate the decrease in the price charged for regular data transfers as proportional to the difference between a nominally allocated data transfer rate or requested data transfer rate, whichever is less, and an actual data transfer rate multiplied by a time during which such difference exists. The system may also calculate a surcharge for the preferred data transfers as a price that is proportional to the difference between an actual data transfer rate (ADTR) and a nominally allocated data transfer rate (NADTR), multiplied by a time during which such difference occurs, where:

a) NADTR=$c_l$/(W1*NR+W2*NP), where NR is the number of regular data transfers, NP is the number of preferred data transfers, W1 is a relative weighting reflective of the network bandwidth allocated to regular data transfers, and W2 is a relative weighting reflective of the network bandwidth allocated to preferred data transfers, and b) ADTR is the minimum of either: 1) the quantity of data to be transferred by the preferred data transfers divided by the time interval between a start time and a specified delivery time, or 2) the difference between the virtual link capacity cl and the sum of the data transfer rates of each preferred transfer.

The system may also be used to calculate an expected congestion cost for a proposed preferred data that is to be performed at a specified minimum data transfer rate, with the expected congestion cost then used for price-based allocation of bandwidth to preferred data transfers. For example, a bid may be solicited for the proposed preferred data transfer; with the bid accepted only if the expected congestion cost is below a specified limit value. In another example, a bid is solicited for the proposed preferred data transfer, and the proposed preferred data transfer is executed as a preferred data transfer if the expected congestion cost is below a specified limit value and executed as a regular data transfer otherwise.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A method implemented as software executing in one or more host processors, comprising:
   executing one or more processes that transfer data over a network as regular data transfers;
   implementing a virtual link control module that determines an aggregate traffic rate of the data transferred over the network by the regular data transfers and provides a virtual link through which the regular data transfers flow, wherein the virtual link includes a virtual queue that is filled or emptied in accordance with whether the aggregate traffic rate is greater than or less than, respectively, a specified bandwidth limit $c_l$;
   implementing a rate control module that regulates the data transfer rate x(t) of each of the regular data transfers based upon a calculated virtual queuing delay reflective of the extent to which the virtual queue is filled with data;
   executing one or more processes that transfer data over the network as preferred data transfers that meet a specified delivery deadline;
   executing the virtual link control module to determine a congestion cost to the regular data transfers as a result of the preferred data transfers; and,
   calculating a charge for the preferred data transfers as a price that is proportional to the difference between an actual data transfer rate attained by the regular data transfers (ADTR) and a nominally allocated data transfer rate (NADTR) multiplied by a time during which such difference occurs and the number of regular data transfers.

2. The method of claim 1 further comprising decreasing the specified bandwidth limit $c_l$ of the virtual link to an extent necessary for the preferred data transfers to meet the specified delivery deadline.

3. The method of claim 1 further comprising performing the preferred data transfers at a constant rate sufficient to meet the specified delivery deadline through the virtual link.

4. The method of claim 1 further comprising calculating a relative price, either charged for the preferred data transfers or credited to the regular data transfers, as a function of the congestion cost, wherein the congestion cost is derived from a slowdown caused to existing regular data transfers calculated as the total rate decrease of all regular data transfers from a nominal allocated rate times the duration of the slowdown.

5. The method of claim 1 further comprising decreasing a price charged for regular data transfers as a function of the congestion cost due to the preferred data transfers.

6. The method of claim 5 further comprising calculating the decrease in the price charged for regular data transfers as proportional to the difference between a nominally allocated data transfer rate or requested data transfer rate, whichever is less, and an actual data transfer rate multiplied by a time during which such difference exists.

7. The method of claim 2 further comprising performing the preferred data transfers at the greater of the maximum rate at which there is no congestion cost and the minimum rate necessary to meet the requested delivery deadline, where the minimum rate is equal to the quantity of data to be transferred by the preferred data transfer divided by the time interval between a start time and a specified delivery deadline.

8. The method of claim 1 wherein the ADTR is the difference between the virtual link capacity $c_i$ and the sum of the data transfer rates of each preferred transfer, which difference is then divided by the number of regular data transfers NR.

9. The method of claim 1 further comprising performing the regular data transfers using a data transfer rate that is as high as possible without compromising the specified delivery deadline.

10. The method of claim 1 further comprising executing a preferred data transfer at a data transfer rate that is as high as possible without the congestion cost exceeding a price charged for the preferred data transfer.

11. The method of claim 1 further comprising calculating an expected congestion cost for a proposed preferred data that is to be performed at a specified minimum data transfer rate to meet the specified delivery deadline.

12. The method of claim 11 further comprising:
soliciting a bid for the proposed preferred data transfer: and,
accepting the bid lithe expected congestion cost is below a specified limit value.

13. The method of claim 1 further comprising:
accepting a payment into a user's account for the user's proposed preferred data transfers;
deducting charges from the user's account based on the congestion cost as preferred data transfers are executed; and,
executing the user's proposed preferred data transfers as preferred data transfers if the user's account balance is positive and executing the proposed data transfers as regular data transfers otherwise.

14. A non-transitory computer-readable medium containing instructions executable in one or more host processors for performing a method that comprises:
executing one or more processes that transfer data over a network as regular data transfers;
implementing a virtual link control module that determines an aggregate traffic rate of the data transferred over the network by the regular data transfers and provides a virtual link through which the regular data transfers flow, wherein the virtual link includes a virtual queue that is filled or emptied in accordance with whether the aggregate traffic rate is greater than or less than, respectively, a specified bandwidth limit $c_i$;
implementing a rate control module that regulates the data transfer rate x(t) of each of the regular data transfers based upon a calculated virtual queuing delay reflective of the extent to which the virtual queue is filled with data;
executing one or more processes that transfer data over the network as preferred data transfers that meet a specified delivery deadline;
executing the virtual link control module to determine a congestion cost to the regular data transfers as a result of the preferred data transfers; and,
calculating a charge for the preferred data transfers as a price that is proportional to the difference between an actual data transfer rate attained by the regular data transfers (ADTR) and a nominally allocated data transfer rate (NADTR), multiplied by a time during which such difference occurs and the number of regular data transfers.

15. The medium of claim 14 further comprising instructions for decreasing the specified bandwidth limit $c_i$ of the virtual link to an extent necessary for the preferred data transfers to meet the specified delivery deadline.

16. The medium of claim 14 further comprising instructions for performing the preferred data transfers at a constant rate sufficient to meet the specified delivery deadline through the virtual link.

17. The medium of claim 14 further comprising instructions for calculating a relative price, either charged for the preferred data transfers or credited to the regular data transfers, as a function of the congestion cost, wherein the congestion cost is derived from a slowdown caused to existing regular data transfers calculated as the total rate decrease of all regular data transfers from a nominal allocated rate times the duration of the slowdown.

18. A system, comprising:
one or more host processors connected to a network, wherein one or more of the host processors are programmed with:
one or more processes that transfer data over a network as regular data transfers;
a virtual link control module that determines an aggregate traffic rate of the data transferred over the network by the regular data transfers and provides a virtual link through which the regular data transfers flow, wherein the virtual link includes a virtual queue that is filled or emptied in accordance with whether the aggregate traffic rate is greater than or less than, respectively, a specified bandwidth limit $c_i$;
a rate control module that regulates the data transfer rate x(t) of each of the regular data transfers based upon a calculated virtual queuing delay reflective of the extent to which the virtual queue is filled with data;
one or more processes that transfer data over the network as preferred data transfers that meet a specified delivery deadline; and,
wherein the virtual link control module is further configured to determine a congestion cost to the regular data transfers as a result of the preferred data transfers and to calculate a charge for the preferred data transfers as a price that is proportional to the difference between an actual data transfer rate attained by the regular data transfers (ADTR) and a nominally allocated data transfer rate (NADTR), multiplied by a time during which such difference occurs and the number of regular data transfers.

19. The system of claim 18 wherein one or more host processors are programmed with a module for decreasing the specified bandwidth limit $c_i$ of the virtual link to an extent necessary for the preferred data transfers to meet the specified delivery deadline.

20. The system of claim 18 wherein one or more host processors are programmed with a module for performing the preferred data transfers at a constant rate sufficient to meet the specified delivery deadline through the virtual link.

* * * * *